(12) United States Patent
Elqadah et al.

(10) Patent No.: US 7,017,942 B2
(45) Date of Patent: Mar. 28, 2006

(54) INFLATABLE VEHICLE OCCUPANT PROTECTION DEVICE WITH GRAB HANDLE

(75) Inventors: Wael S. Elqadah, Gilbert, AZ (US); Xingyuan Sun, Gilbert, AZ (US); Bruce R. Hill, Bloomfield Hills, MI (US); John P. Wallner, Rocester Hills, MI (US)

(73) Assignees: TRW Inc., Lyndhurst, OH (US); TRW Vehicle Safety Systems Inc., Lyndhurst, OH (US)

( * ) Notice: Subject to any disclaimer, the term of this patent is extended or adjusted under 35 U.S.C. 154(b) by 28 days.

(21) Appl. No.: 10/262,132

(22) Filed: Oct. 1, 2002

(65) Prior Publication Data

US 2004/0061316 A1    Apr. 1, 2004

(51) Int. Cl.
*B60R 21/16* (2006.01)
*B60R 21/22* (2006.01)

(52) U.S. Cl. .............................. 280/730.2; 280/728.2; 296/214

(58) Field of Classification Search ............. 280/730.2, 280/729, 728.2, 728.3, 730.1, 749; 296/214
See application file for complete search history.

(56) References Cited

U.S. PATENT DOCUMENTS

| | | | |
|---|---|---|---|
| 5,540,459 A | | 7/1996 | Daniel |
| 5,755,457 A | | 5/1998 | Specht |
| 5,788,270 A | | 8/1998 | Haland et al. |
| 5,791,680 A | | 8/1998 | Dyer |
| 5,791,683 A | | 8/1998 | Shibata et al. |
| 6,073,961 A | * | 6/2000 | Bailey et al. ............. 280/730.2 |
| 6,079,735 A | * | 6/2000 | Fallmann et al. ......... 280/730.2 |
| 6,103,984 A | * | 8/2000 | Bowers et al. ........... 280/730.2 |
| 6,135,491 A | | 10/2000 | Olson et al. |
| 6,155,594 A | * | 12/2000 | Ibe et al. .................. 280/730.2 |
| 6,220,623 B1 | * | 4/2001 | Yokota ..................... 280/730.2 |
| 6,224,091 B1 | | 5/2001 | Eyrainer et al. |
| 6,227,561 B1 | * | 5/2001 | Jost et al. ................. 280/730.2 |
| 6,237,942 B1 | * | 5/2001 | Swann ..................... 280/730.2 |
| 6,238,438 B1 | * | 5/2001 | Fischer et al. ........... 280/730.2 |
| 6,296,272 B1 | | 10/2001 | Heigl |
| 6,302,434 B1 | * | 10/2001 | Nakajima et al. ........ 280/730.2 |

FOREIGN PATENT DOCUMENTS

| | | |
|---|---|---|
| DE | 29716574 | 3/1998 |
| DE | 29718305 | 3/1998 |
| DE | 19815381 | 10/1999 |
| EP | 1048531 | 11/2000 |

* cited by examiner

*Primary Examiner*—Ruth Ilan
(74) *Attorney, Agent, or Firm*—Tarolli, Sundheim, Covell & Tummino L.L.P.

(57) ABSTRACT

Apparatus (10) for helping to protect an occupant of a vehicle (12) that has a side structure (16) and a roof (18) includes an inflatable vehicle occupant protection device (14). The inflatable vehicle occupant protection device (14) is inflatable away from the vehicle roof (18) into a position between the side structure (16) of the vehicle (12) and a vehicle occupant. The apparatus (10) also includes a housing (26) for storing the inflatable vehicle occupant protection device (14) in a stored position extending along the vehicle side structure (16) adjacent the vehicle roof (18). The housing (26) includes a portion that forms an interior trim piece (190) of the vehicle (12). The apparatus (10) also includes at least one grab handle (34) and at least one connector (200) that extends through the inflatable vehicle occupant protection device (14), the housing (26) and the grab handle. The connector (200) connects the inflatable vehicle occupant protection device (14), housing (26) and grab handle (34) to the vehicle (12).

28 Claims, 5 Drawing Sheets

INFLATABLE VEHICLE OCCUPANT PROTECTION DEVICE WITH GRAB HANDLE

FIELD OF THE INVENTION

The present invention relates to an inflatable apparatus for helping to protect a vehicle occupant in the event of a side impact to a vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of the vehicle in the event of a side impact or rollover. Another type of inflatable vehicle occupant protection device is an inflatable tubular structure that inflates between a vehicle occupant and the side structure of the vehicle in the event of a side impact or a rollover.

SUMMARY OF THE INVENTION

The present invention relates to an apparatus for helping to protect an occupant of a vehicle that has a side structure and a roof. The apparatus comprises an inflatable vehicle occupant protection device that is inflatable away from the vehicle roof into a position between the side structure of the vehicle and a vehicle occupant. The apparatus further comprises a housing for storing the inflatable vehicle occupant protection device in a stored position extending along the vehicle side structure adjacent the vehicle roof. The housing includes a portion that forms an interior trim piece of the vehicle. The apparatus further comprises at least one grab handle and at least one connector that extends through the inflatable vehicle occupant protection device, the housing and the grab handle. The connector connects the inflatable vehicle occupant protection device, housing and grab handle to the vehicle.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF PREFERRED EMBODIMENTS

Figure 1:
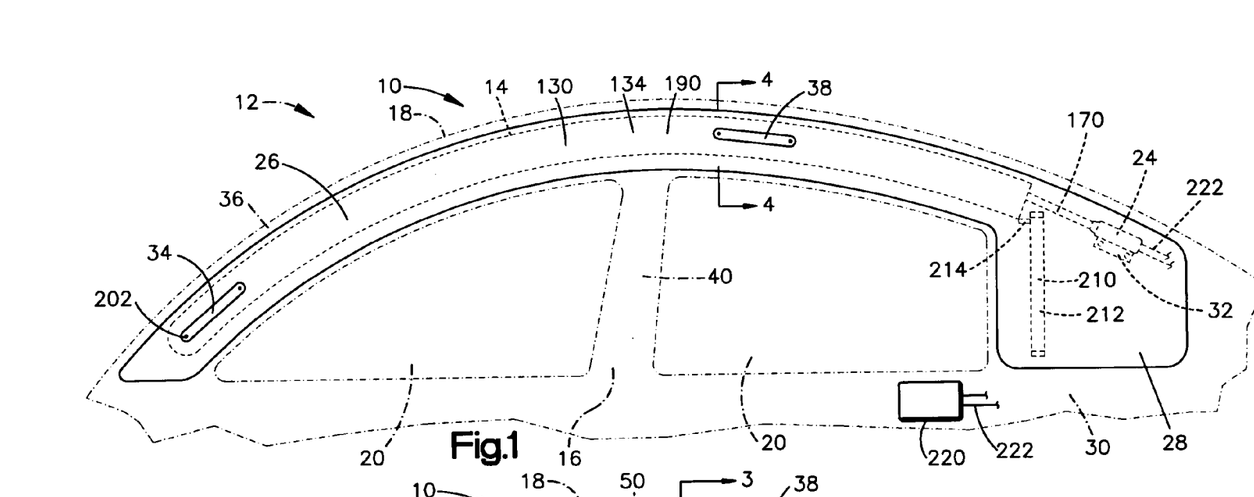
FIG. 1 is a schematic view of an inflatable apparatus for helping to protect a vehicle occupant illustrating the apparatus in a deflated condition, according to a first embodiment of the invention.
Figure 2:
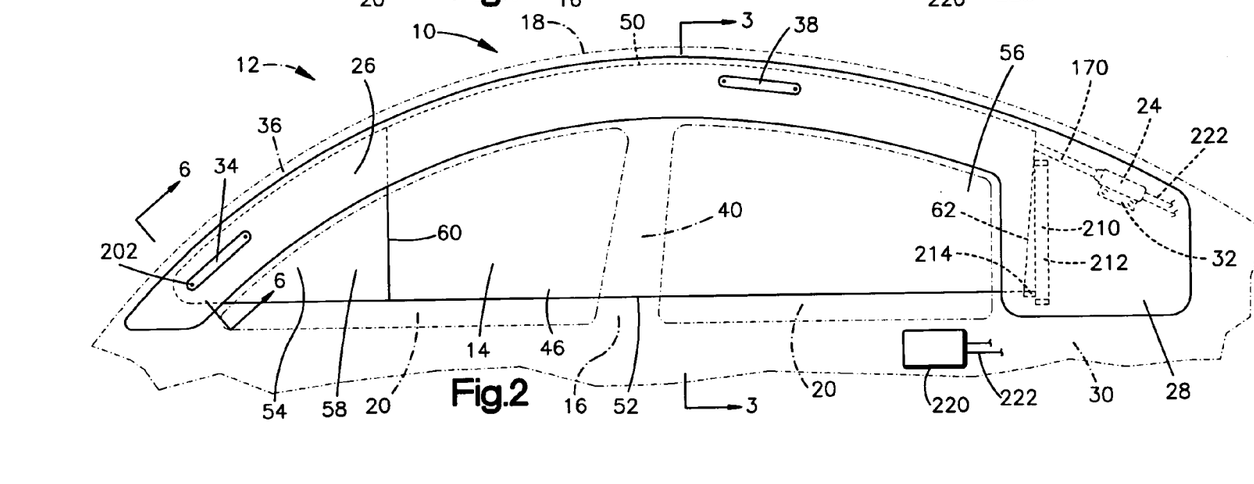
FIG. 2 is a schematic view of the apparatus of FIG. 1 in an inflated condition.

As representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent to the side structure 16 of the vehicle 12 and a roof 18 of the vehicle. The side structure 16 of the vehicle 12 includes side windows 20.

The apparatus 10 includes an inflator 24 for providing inflation fluid to inflate the inflatable curtain 14. The inflator 24 contains a stored quantity of pressurized inflation fluid (not shown) in the form of a gas. The inflator 24 alternatively could contain a combination of pressurized inflation fluid and ignitable material for heating the inflation fluid, or could be a pyrotechnic inflator that uses the combustion of gas-generating material to generate inflation fluid. In fact, the inflator 24 could be of any suitable type or construction for supplying a medium for inflating the inflatable curtain 14.

The apparatus 10 includes a housing 26 that stores the inflatable curtain 14 in a stored position (FIG. 1) prior to inflation of the curtain. The deflated inflatable curtain 14 and housing 26 have an elongated configuration and extend along the vehicle roof 18 and along the side structure 16 of the vehicle 12 above the side windows 20.

The housing 26 (FIGS. 1 and 2) includes a portion 28 that extends adjacent to one of the side windows 20 of the vehicle 12 and overlies at least a portion of a C pillar 30 of the vehicle. The inflator 24 is connected to the portion 28 of the housing 26 by known means 32 such as a clamp or bracket. The means 32 may include a portion that is constructed from the same piece of material as the housing 26.

A first grab handle 34 is connected to the vehicle side structure 16 on or near an A pillar 36 of the vehicle. A second grab handle 38 is connected to the vehicle side structure 16 near the intersection of the side structure and the vehicle roof 18. The second grab handle 38 may be positioned on or near a B pillar 40 of the vehicle 12.

Figure 3:
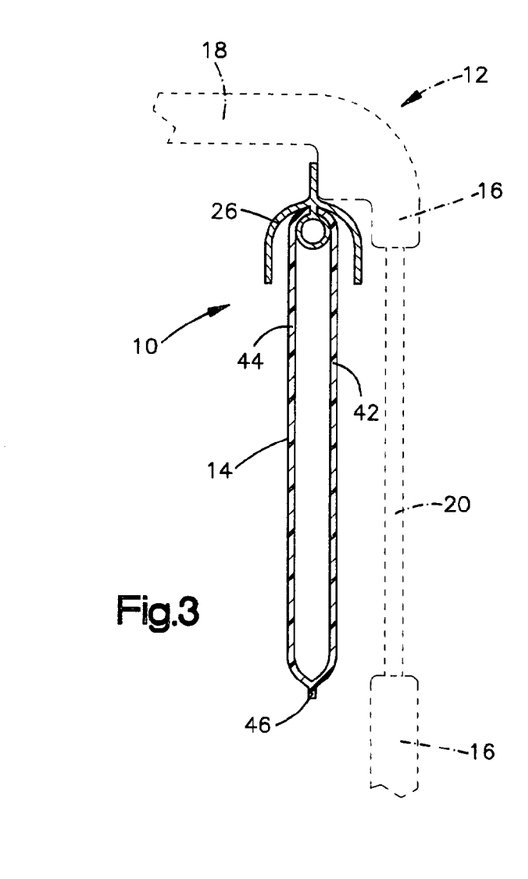
FIG. 3 is a sectional view of the apparatus taken generally along line 3—3 in FIG. 2.

As illustrated in FIG. 3, the inflatable curtain 14 comprises first and second panels 42 and 44 that are arranged in an overlying manner. Overlapping portions of the first and second panels 42 and 44 are secured together by weaving or stitching the panels together along at least a portion of a perimeter 46 (FIGS. 2 and 3) of the inflatable curtain 14 to define an inflatable volume of the curtain.

The first and second panels 42 and 44 (FIG. 3) are constructed of a fabric, such as nylon, that is coated with a gas impermeable material, such as urethane or silicone. The inflatable curtain 14 thus has a substantially gas-tight construction. Other materials, such as elastomers, plastic films, or combinations thereof may also be used to construct the inflatable curtain 14. The first and second panels 42 and 44 may also be formed of single or multi-layered sheets of material.

The inflatable curtain 14 (FIG. 2) includes an upper edge 50, an opposite lower edge 52, and front and rear portions 54 and 56, respectively, spaced apart horizontally along the upper and lower edges. As illustrated in FIG. 2, the front portion 54 of the inflatable curtain 14 may comprise a non-inflatable portion 58 of the curtain. The non-inflatable portion 58 is partially defined by a seam 60 that extends generally vertically between the upper and lower edges 50 and 52 of the inflatable curtain 14. The non-inflatable portion 58 is further defined by portions of the upper and lower edges 50 and 52 that extend forward in the vehicle 12 from the seam 60 until they intersect. The rear portion 56 of the inflatable curtain 14 includes a rear edge 62 that extends generally vertically between the upper and lower edges 50 and 52.

Figure 4:
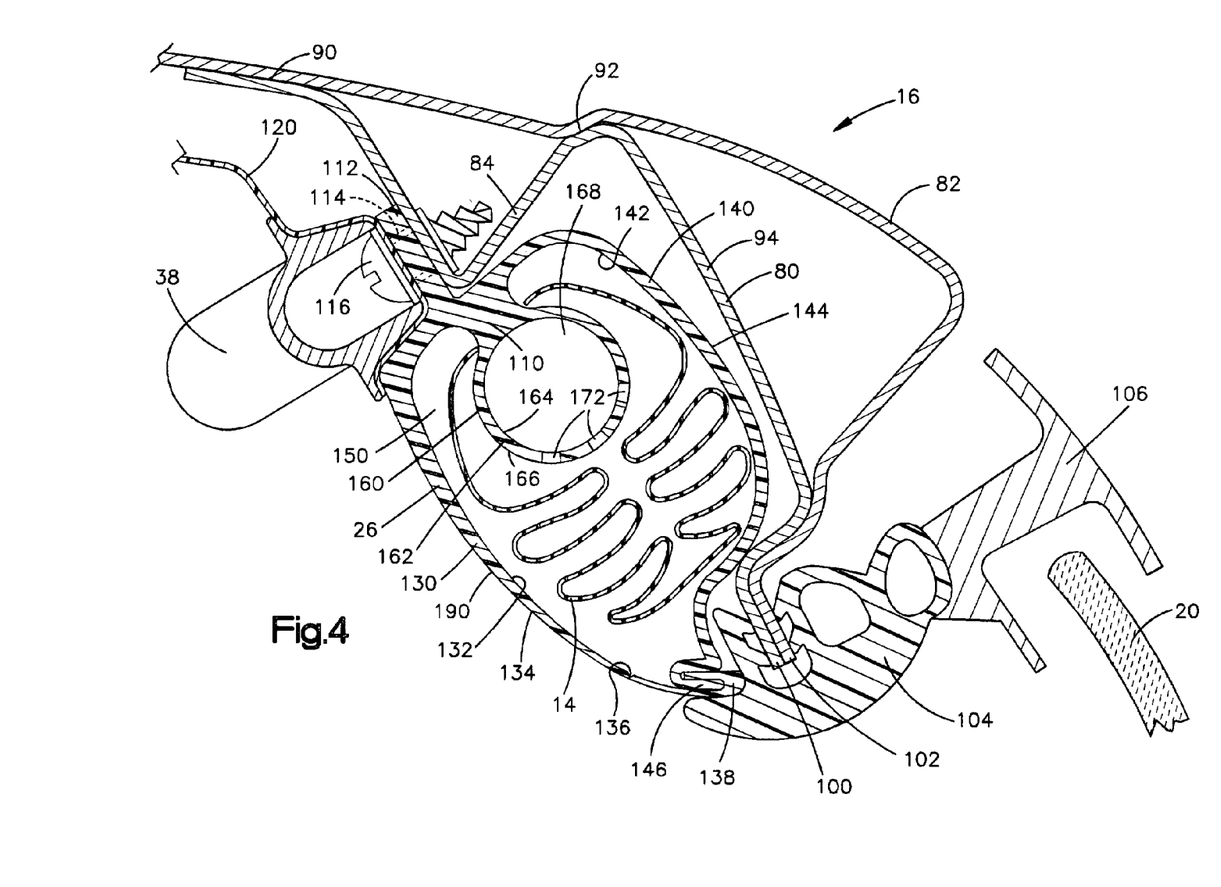
FIG. 4 is a sectional view of the apparatus taken generally along line 4—4 in FIG. 1.

Referring now to FIG. 4, the vehicle side structure 16 includes a metal support rail 80 adjacent to and inside a roof panel 82. A V-shaped inner section 84 of the support rail 80 is welded to the roof panel 82 at two locations 90 and 92. A main leg 94 of the support rail 80 extends downward and outward from the inner section 84. An outer edge portion 100 of the support rail 80 overlies and is welded to an outer edge portion 102 of the roof panel 82.

The vehicle side structure 16 also includes a window seal or bulb seal 104 that is supported on the outer edge portion 102 of the roof panel 82 and the outer edge portion 100 of the support rail 80. A vehicle door 106 supports the side window 20 and engages the bulb seal 104 when the door is closed.

As illustrated in FIG. 4, the housing 26 is constructed of a single piece of homogeneous material. The housing 26 is preferably extruded or molded from a plastic material. The housing 26 includes a central body portion 110 and a mounting flange 112 that projects from the central body portion 110. The mounting flange 112 has a generally rectangular cross-section and includes at least one aperture 114 for receiving a fastener 116, such as a screw or bolt. The fastener 116 connects the housing and the second grab handle 38 (FIGS. 1, 2 and 4) to the inner section 84 (FIG. 4) of the vehicle side structure 16. The fastener 116 may also connect a vehicle headliner 120 to the vehicle side structure 16.

The housing 26 includes an inner cover flap 130 and an outer cover flap 140. The cover flaps 130 and 140 extend from the central body portion 110 in directions away from the mounting flange 112 and away from each other. The cover flaps 130 and 140 extend for substantially the entire length of the housing 26.

The inner cover flap 130 has an inner side surface 132 and an outer side surface 134. The inner side surface 132 of the inner cover flap 130 includes a tear seam 136 in the form of a notch or slot that extends along a substantial portion of the length of the inner cover flap. The inner cover flap has a generally U-shaped terminal edge portion 138 along its edge opposite the central body portion 110. The outer cover flap 140 has an inner side surface 142 and an outer side surface 144. The outer cover flap 140 has a generally U-shaped terminal edge portion 146 along its edge opposite the central body portion 110.

The terminal edge portions 138 and 146 of the inner and outer cover flaps 130 and 140 interlock with each other to connect the inner and outer cover flaps. The interlocking terminal edge portions 138 and 146 are received under the bulb seal 104. The inner and outer cover flaps 130 and 140 thus help to define an enclosed storage area 150 for the inflatable curtain 14 when the curtain is deflated and folded in the stored condition.

The housing 26 includes a fill tube 160 that extends downward (as viewed in FIGS. 4 and 5) from the central body portion 110 of the housing, between the inner and outer flaps 130 and 140. The fill tube 160 has an elongated, tubular configuration and extends for a major portion of the length of the housing 26. The fill tube 160 includes a side wall 162 having parallel, generally cylindrical, inner and outer side surfaces 164 and 166. The inner side surface 164 of the side wall 162 defines a fluid flow passage 168 in the fill tube 160.

A conduit 170 (FIGS. 1 and 2) connects the inflator 24 to the fill tube 160 and provides fluid communication between the inflator and the fill tube.

Figure 5:
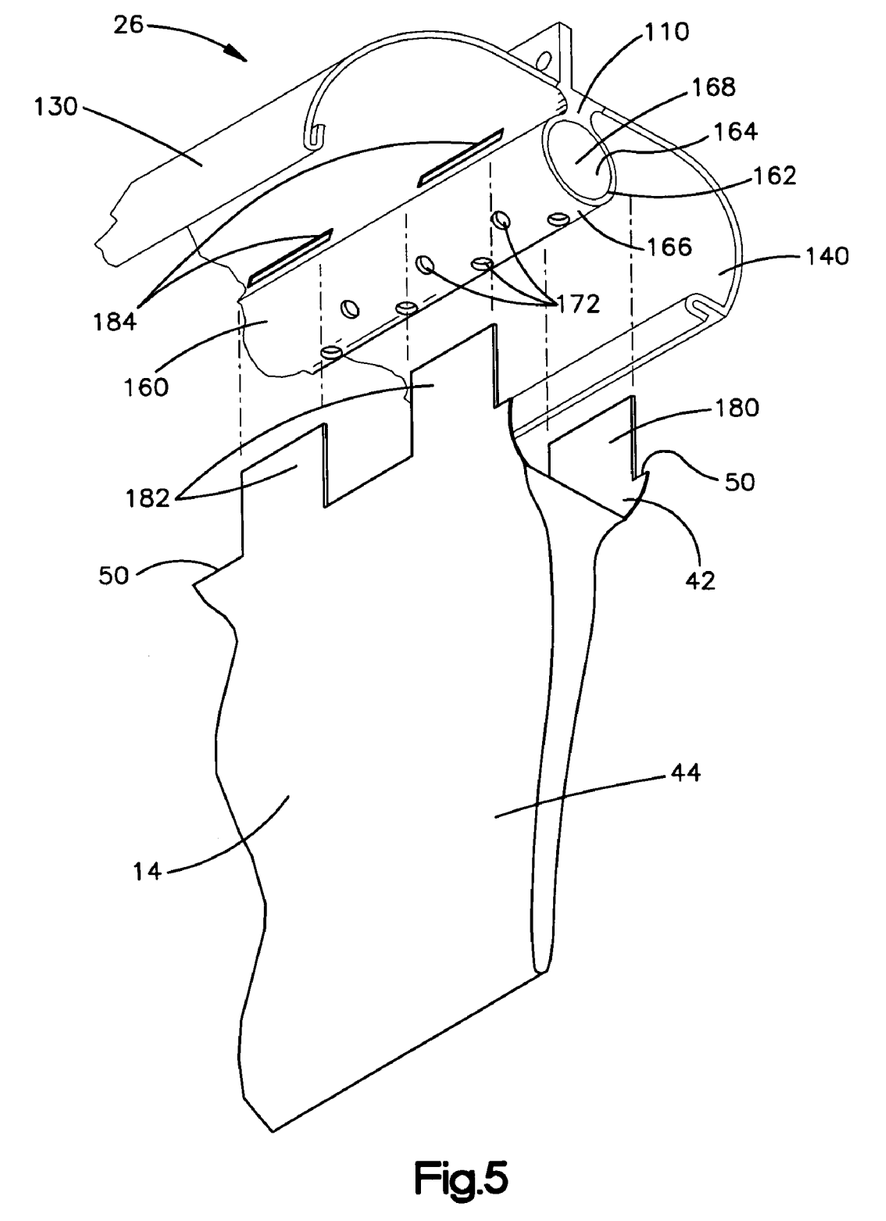
FIG. 5 is a perspective view of a portion of the apparatus of FIG. 1, illustrating the assembly of the apparatus.

The fill tube 160 includes a plurality of inflation fluid outlets 172. The inflation fluid outlets 172 are openings in the side wall 162 that extend radially between the inner and outer side surfaces 164 and 166 of the side wall. The inflation fluid outlets 172 are spaced along the length of the fill tube 160 and are directed generally away from the central body portion 110 of the housing 26.

The cover flaps 130 and 140 have a generally curved configuration and are resiliently movable from the closed condition illustrated in FIG. 4 to an opened condition illustrated in FIG. 5 and vice versa. The inflatable curtain 14 may be connected to the housing 26 when the housing is in the opened condition. As illustrated in FIG. 5, the inflatable curtain 14 includes first tabs 180 that extend from the first panel 42 along the upper edge 50 of the curtain and second tabs 182 that extend from the second panel 44 along the upper edge of the curtain. The first and second tabs 180 and 182 are insertable into slots 184 that extend through the central body portion 110. The first and second tabs 180 and 182 extend through the slots 184 and are positioned such that portions of the tabs overlie each other. The overlying portions of the tabs 180 and 182 are interconnected by known means, such as stitching, ultrasonic bonding, or adhesive bonding, to connect the inflatable curtain 14 to the housing 26.

It will be recognized by those skilled in the art that there may be alternative methods by which to connect the inflatable curtain 14 to the housing 26. For example, the housing 26 may include hooks that support the inflatable curtain 14, or the curtain may be fitted with C-shaped snap rings that clamp around the fill tube 160 to connect the curtain to the housing. The housing 26 could also include bead channels that receive the upper edge 50 of the first and second panels 42 and 44 to secure the inflatable curtain 14 to the housing. When the inflatable curtain 14 is connected to the housing 26, the fill tube 160 is disposed in the inflatable volume of the curtain. The inflation fluid outlets 172 provide fluid communication between the fill tube 160 and the inflatable curtain 14.

When the inflatable curtain 14 is connected to the housing 26, the curtain is folded and the inner and outer flaps 130 and 140 are closed around the curtain to store the curtain in the storage area 150 (FIG. 4) of the housing. When the inflatable curtain 14 is in the stored position of FIGS. 1 and 4, the outer side surface 134 of the inner cover flap 130 forms an interior trim piece 190 of the vehicle 12. The interior trim piece 190 is an exposed surface that is visible from inside the vehicle passenger compartment.

Figure 6:
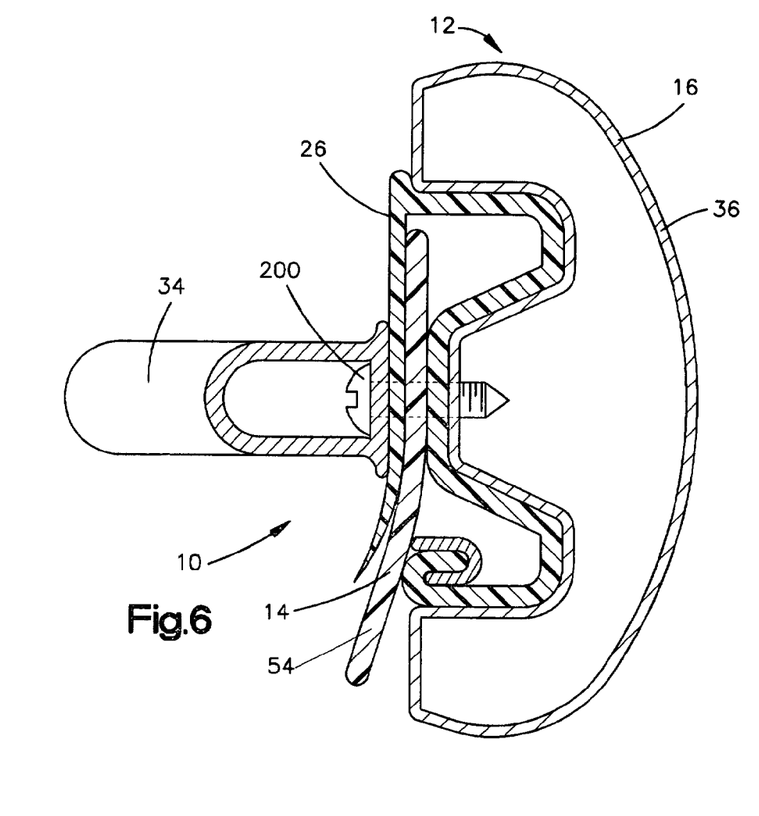
FIG. 6 is a sectional view of the apparatus taken generally along line 6—6 in FIG. 2.

As illustrated in FIG. 6, the first grab handle 34 is connected to the vehicle side structure 16 by a fastener 200, such as a screw or bolt. The fastener 200 extends through the first grab handle 34, the housing 26, and the inflatable curtain 14, and connects the first grab handle, housing, and inflatable curtain to the vehicle side structure 16 at a first location 202 (FIGS. 1 and 2) on the side structure. The first location 202 may be located on or near the A pillar 36 of the vehicle 12. In the embodiment illustrated in FIG. 6, the fastener 200 extends through the front portion 54 of the inflatable curtain 14 to connect the curtain to the vehicle side structure 16.

Referring now to FIGS. 1 and 2, the apparatus 10 may also include a slider assembly 210 connected to the vehicle 12 at a location on or near the C pillar 30 of the vehicle. The slider assembly 210 may be mounted on the portion 28 of the housing 26. The slider assembly 210 includes a track 212 and an element 214 that is slidable along the track. The inflatable curtain 14 is connected to the element 214 at a location near the intersection of the lower edge 52 and rear edge 62 of the curtain. The inflatable curtain 14 may also be connected to the element 214 by a tether (not shown).

The vehicle 12 includes a sensor mechanism 220 (shown schematically in FIGS. 1 and 2) for sensing a side impact to the vehicle 12 and/or a rollover of the vehicle 12. The sensor mechanism 220 actuates the inflator 24 in response to the sensing of a side impact or a vehicle rollover.

In the event of a rollover of the vehicle or a side impact to the vehicle 12 of a magnitude greater than a predetermined threshold value, the sensor mechanism 220 provides an electrical signal over lead wires 222 to the inflator 24. The electrical signal causes the inflator 24 to be actuated in a known manner. The inflator 24 discharges fluid under pressure through the conduit 170 and into the fill tube 160. The fill tube 160 directs the fluid into the inflatable curtain 14.

The inflatable curtain 14 inflates under the pressure of the inflation fluid from the inflator 24. The housing 26 (FIG. 4) opens along the tear seam 136 under the pressure of the inflation fluid in the inflatable curtain 14. The inflatable curtain 14 inflates away from the roof 18 in a downward direction as shown in the drawings and in a downward direction with respect to the direction of forward travel of the vehicle 12 into the position illustrated in FIGS. 2, 3 and 5.

The inflatable curtain 14, when inflated, extends along the side structure 16 of the vehicle 12 and is positioned between the side structure and any occupant of the vehicle. When the inflatable curtain 14 is in the inflated condition, the first panel 42 is positioned adjacent the side structure 16 of the vehicle 12. The upper edge 50 (FIG. 2) is positioned adjacent to the intersection of the roof 18 and the side structure 16 of the vehicle 12. The front portion 54 is positioned adjacent to the A pillar 36 of the vehicle 12. The rear portion 56 of the inflatable curtain 14 is positioned adjacent to the C pillar 30 of the vehicle 12. The inflatable curtain 14 extends between the A pillar 36 and the C pillar 30 of the vehicle 12 and overlies at least a portion of the A pillar, C pillar, and the B pillar 40 of the vehicle.

It will be recognized by those skilled in the art that the inflatable curtain 14 may have alternative configurations. For example, in the illustrated embodiment, the inflatable curtain 14 extends between the A pillar 36 and the C pillar 30 of the vehicle 12. The inflatable curtain 14 could, however, extend between the A pillar 36 and the B pillar 40 only or between the B pillar and the C pillar 30 only. Also, in a vehicle having A, B, C, and D pillars (not shown), the inflatable curtain 14 could, when inflated, extend between the A pillar and the D pillar.

The inflatable curtain 14, when inflated, helps to protect a vehicle occupant in the event of a vehicle rollover or a side impact to the vehicle 12. When inflated, the inflatable curtain 14 helps to absorb the energy of impacts with the curtain and helps to distribute the impact energy over a large area of the curtain.

Figure 7:
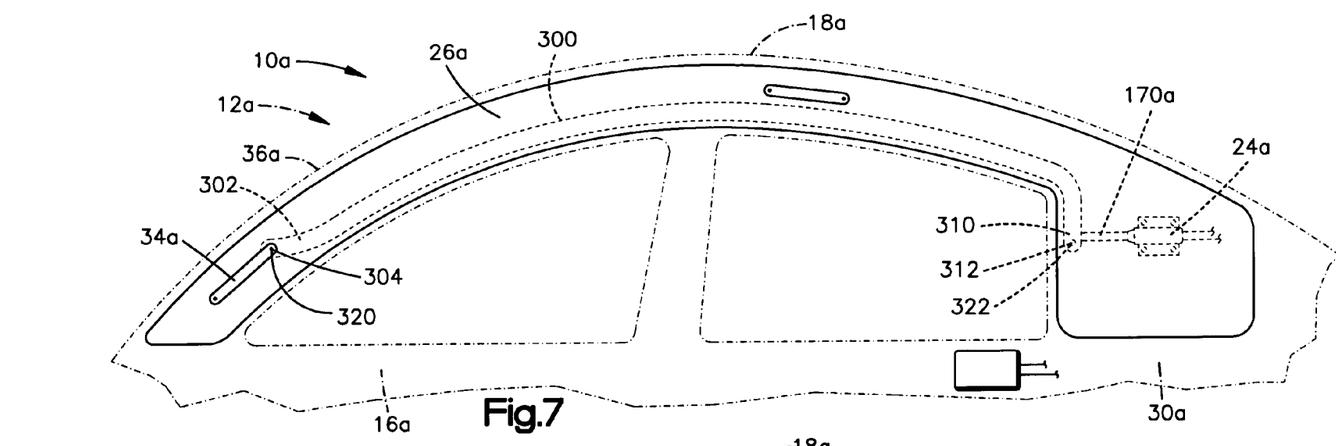
FIG. 7 is a schematic view of an inflatable apparatus for helping to protect a vehicle occupant illustrating the apparatus in a deflated condition, according to a second embodiment of the invention.
Figure 8:
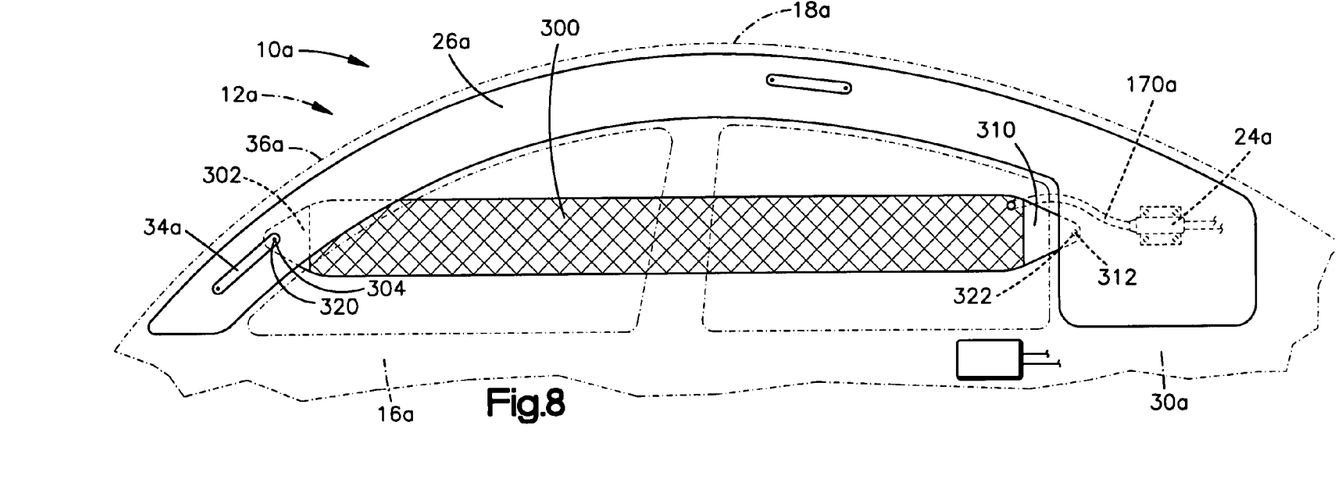
FIG. 8 is a schematic view of the apparatus of FIG. 7 in an inflated condition.

A second embodiment of the present invention is illustrated in FIGS. 7 and 8. The second embodiment of the invention is similar to the first embodiment of the invention illustrated in FIGS. 1–6. Accordingly, numerals similar to those of FIGS. 1–6 will be utilized in FIGS. 7 and 8 to identify similar components, the suffix letter "a" being associated with the numerals of FIGS. 7 and 8 to avoid confusion.

The apparatus 10a (FIGS. 7 and 8) of the second embodiment is generally identical to the apparatus 10 (FIGS. 1–6) with some exceptions. In the second embodiment, the apparatus 10a includes an inflatable vehicle occupant protection device in the form of an inflatable tubular structure 300 (FIGS. 7 and 8), instead of the inflatable curtain 14 (FIGS. 1–6) of the first embodiment. Also, the housing 26a of the second embodiment does not include a fill tube because the inflatable tubular structure 300 does not require a fill tube. Rather, the conduit 170a is connected directly to the inflatable tubular structure 300.

The inflatable tubular structure 300 has a first end 302 connected to the vehicle side structure 16a at a first location 304 and an opposite second end 310 connected to the side structure at a second location 312. The first location 304 may be located on or near the A pillar 36a of the vehicle 12a and the second location 312 may be located on or near the C pillar 30a of the vehicle.

The first end 302 of the inflatable tubular structure 300 is connected to the vehicle 12a by a fastener 320, such as a screw or bolt. The fastener 320 extends through the first grab handle 34a, the housing 26a, and the inflatable tubular structure 300, and connects the first grab handle, housing, and inflatable tubular structure to the vehicle side structure 16a at the first location 304.

The second end 310 of the inflatable tubular structure 300 is connected to the vehicle 12a by a fastener 322, such as a screw or bolt. The fastener 322 extends through the housing 26a and the inflatable tubular structure 300, and connects the housing and inflatable tubular structure to the vehicle side structure 16 at the second location 312.

The inflatable tubular structure 300, when deflated, extends in the housing 26a along the intersection of the side structure 16a of the vehicle 12a and the vehicle roof 18a. Upon inflation of the inflatable tubular structure 300, the tubular structure moves from the position illustrated in FIG. 7 to the position illustrated in FIG. 8.

The inflatable tubular structure 300, when inflated, extends along the side structure 16a of the vehicle 12a and is positioned between the side structure and any occupant of the vehicle. The inflatable tubular structure 300 helps to protect a vehicle occupant in the event of a vehicle rollover or a side impact to the vehicle 12a. The inflatable tubular structure 300 helps to absorb the energy of impacts with the tubular structure and helps to distribute the impact energy over a large area of the tubular structure.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle that has a side structure, a roof, and a headliner covering the roof, said apparatus comprising:

an inflatable vehicle occupant protection device inflatable between the side structure of the vehicle and a vehicle occupant;

a housing for storing said inflatable vehicle occupant protection device in a stored position along the vehicle side structure adjacent the vehicle roof, said housing including a portion that extends beyond the headliner and forms an interior trim piece of the vehicle;

at least one grab handle; and at least one connector extending through said headliner, said housing, and said grab handle to connect said inflatable vehicle occupant protection device, said headliner, said housing, and said grab handle to the vehicle.

2. Apparatus as defined in claim 1, further including an inflation fluid source that provides inflation fluid to said inflatable vehicle occupant protection device for inflating said inflatable vehicle occupant protection device, said inflation fluid source being connected to said housing.

3. Apparatus as defined in claim 2, wherein said housing includes a portion that is in fluid communication with said inflation fluid source for delivering said inflation fluid from said inflation fluid source to said inflatable vehicle occupant protection device.

4. Apparatus as defined in claim 3, wherein said portion comprises a fill tube for delivering said inflation fluid to said inflatable vehicle occupant protection device.

5. Apparatus as defined in claim 3, wherein said housing is constructed of a single piece of homogeneous material.

6. Apparatus as defined in claim 5, wherein said material is plastic.

7. Apparatus as defined in claim 1, wherein said at least one connector connects said inflatable vehicle occupant protection device, said housing and said grab handle to the vehicle at a location on or near an A pillar of the vehicle.

8. Apparatus as defined in claim 1, wherein said housing extends along the side structure of the vehicle between an A pillar and a C pillar of the vehicle.

9. Apparatus as defined in claim 1, wherein said inflatable vehicle occupant protection device is an inflatable curtain.

10. Apparatus as defined in claim 9, wherein said inflatable curtain when inflated extends along the side structure of the vehicle between an A pillar and a C pillar of the vehicle.

11. Apparatus as defined in claim 9, wherein said inflatable curtain, when inflated, overlies at least a portion of an A pillar, a B pillar and a C pillar of the vehicle.

12. Apparatus as defined in claim 9, wherein said inflatable curtain includes a first portion positioned between the vehicle side structure and an occupant of the vehicle and overlying at least a portion of a B pillar of the vehicle when said inflatable curtain is inflated, and a second portion extending between said first portion and an A pillar of the vehicle.

13. Apparatus as defined in claim 12, wherein said at least one grab handle is positioned adjacent said second portion of said inflatable curtain, said at least one connector extending through said second portion of said inflatable curtain, said housing and said grab handle to connect said second portion of said inflatable curtain, said housing and said grab handle to the vehicle side structure.

14. Apparatus as defined in claim 13, wherein said connector connects said second portion of said inflatable curtain, said housing and said grab handle to the A pillar of the vehicle.

15. Apparatus as defined in claim 12, wherein said first portion of said inflatable curtain is inflatable and said second portion of said inflatable curtain is non-inflatable.

16. Apparatus as defined in claim 2, further comprising a sensor for sensing a vehicle condition for which deployment of said inflatable vehicle occupant protection device is desired, said sensor actuating said inflation fluid source to provide inflation fluid to inflate said inflatable vehicle occupant protection device.

17. Apparatus as defined in claim 2, wherein said inflation fluid source comprises an inflator that is actuatable to inflate said inflatable vehicle occupant protection device.

18. Apparatus as defined in claim 1, wherein said connector connects a non-inflatable front portion of said inflatable vehicle occupant protection device to the vehicle, said front portion having an upper edge extending along the A pillar and a lower edge that merges with a lower edge of the remainder of said inflatable vehicle occupant protection device.

19. Apparatus for helping to protect an occupant of a vehicle that has a side structure and a roof, said apparatus comprising:
an inflatable vehicle occupant protection device that is inflatable in a direction away from the vehicle roof into a position between the side structure of the vehicle and a vehicle occupant, said inflatable vehicle occupant protection device comprising an inflatable tubular structure that when inflated extends along the side structure of the vehicle between an A pillar and a C pillar of the vehicle;
a housing for storing said inflatable vehicle occupant protection device in a stored position extending along the vehicle side structure adjacent the vehicle roof, said housing including a portion that forms an interior trim piece of the vehicle;
at least one grab handle; and
at least one connector extending through said inflatable vehicle occupant protection device, said housing and said grab handle to connect said inflatable vehicle occupant protection device, said housing and said grab handle to the vehicle.

20. Apparatus as defined in claim 19, wherein said inflatable tubular structure, when inflated, overlies at least a portion of an A pillar, a B pillar and a C pillar of the vehicle.

21. Apparatus as defined in claim 19, wherein said housing extends along the side structure of the vehicle between the A pillar and the C pillar of the vehicle.

22. Apparatus as defined in claim 19, wherein said inflatable tubular structure has a first end connected to the vehicle side structure at a first location and an opposite second end connected to the vehicle side structure at a second location.

23. Apparatus as defined in claim 22, wherein said at least one grab handle is positioned adjacent said first end of said inflatable tubular structure, said at least one connector extending through said first end of said inflatable tubular structure, said housing and said grab handle to connect said first end of said inflatable tubular structure, said housing and said grab handle to the vehicle side structure at said first location.

24. Apparatus as defined in claim 23, wherein said first location is on an A pillar of the vehicle.

25. Apparatus for helping to protect an occupant of a vehicle that has a side structure, a roof, and a headliner, said apparatus comprising:
an inflatable vehicle occupant protection device inflatable away from the vehicle roof between the side structure of the vehicle and a vehicle occupant;
a housing for storing said inflatable vehicle occupant protection device in a stored position;
at least one grab handle; and
at least one connector extending through said grab handle and said housing to connect said inflatable vehicle occupant protection device, said housing, and said grab handle to the vehicle, said housing being separate from the headliner and including a portion that forms an interior trim piece for covering a portion of the vehicle side structure not covered by the headliner, wherein said connector extends through a terminal edge portion of the headliner to connect the headliner to the vehicle.

26. Apparatus for helping to protect an occupant of a vehicle that has a side structure, a roof, and a headliner, said apparatus comprising:

an inflatable vehicle occupant protection device inflatable away from the vehicle roof between the side structure of the vehicle and a vehicle occupant;

a housing for storing said inflatable vehicle occupant protection device in a stored position;

at least one grab handle; and at least one connector extending through said grab handle and said housing to connect said inflatable vehicle occupant protection device, said housing, and said grab handle to the vehicle, said housing being separate from the headliner and including a portion that forms an interior trim piece for covering a portion of the vehicle side structure not covered by the headliner, said portion of said housing forming a trim piece covers a portion of the vehicle side structure extending from a terminal edge of the headliner to a side window seal of the vehicle wherein said grab handle covers the terminal edge of the headliner.

27. The apparatus defined in claim 26, wherein the portion of the vehicle side structure not covered by the headliner extends from a terminal edge of the headliner to a side window seal of the vehicle.

28. Apparatus for helping to protect an occupant of a vehicle that has a side structure, a roof, and a headliner, said apparatus comprising:

an inflatable vehicle occupant protection device inflatable away from the vehicle roof between the side structure of the vehicle and a vehicle occupant;

a housing for storing said inflatable vehicle occupant protection device in a stored position;

at least one grab handle; and at least one connector extending through said grab handle and said housing to connect said inflatable vehicle occupant protection device, said.housing, and said grab handle to the vehicle, said housing being separate from the headliner and including a portion that forms an interior trim piece for covering a portion of the vehicle side structure not covered by the headliner, wherein said connector clamps a terminal edge portion of the headliner between said grab handle and said housing.

* * * * *